Nov. 16, 1954  A. F. OATLEY  2,694,392
COOKER AND GRILL
Filed June 22, 1951
6 Sheets-Sheet 1
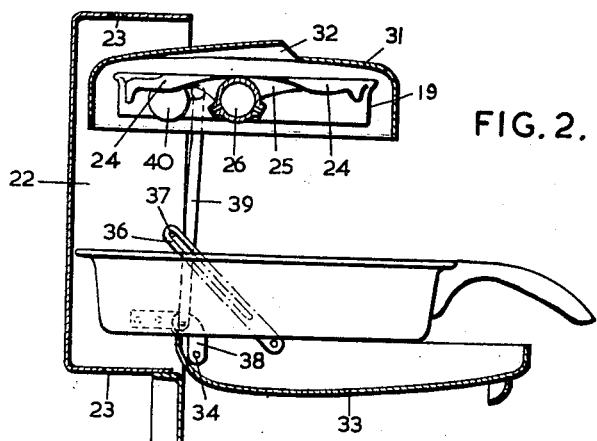
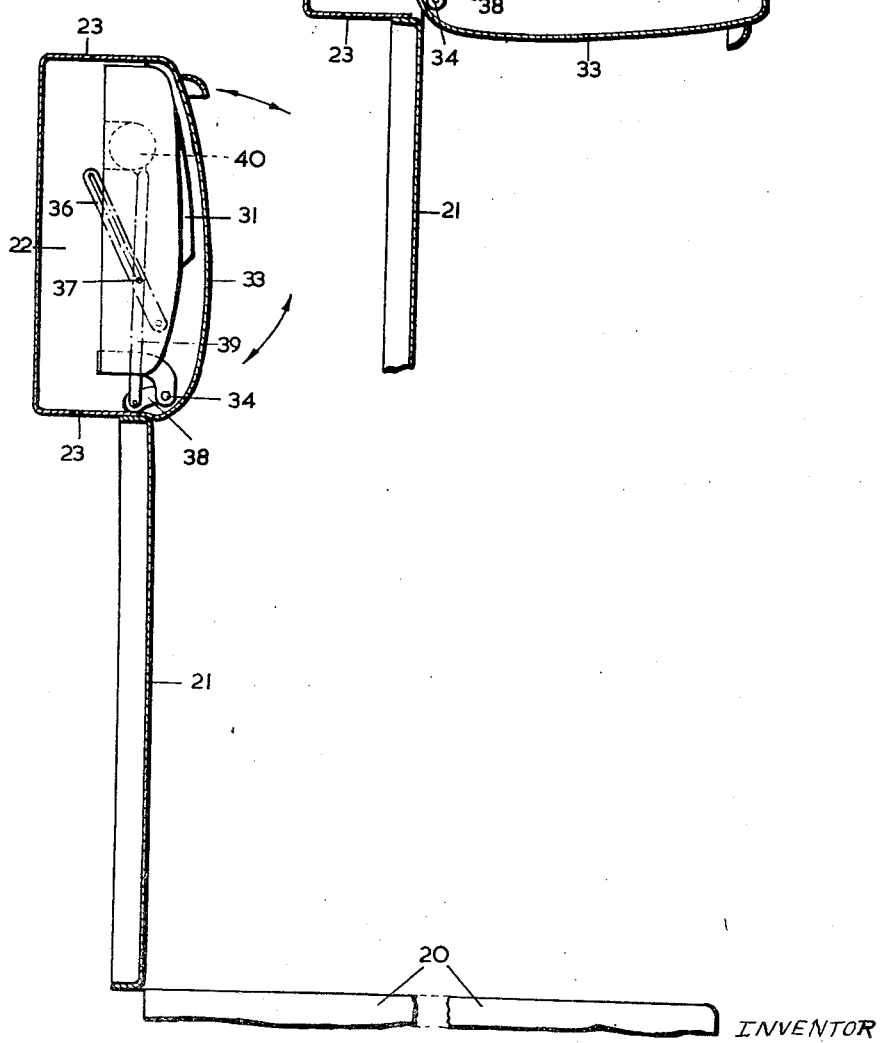
INVENTOR
Arthur F. Oatley
By Ralph B. Stewart
attorney Nov. 16, 1954  A. F. OATLEY  2,694,392
COOKER AND GRILL Filed June 22, 1951  6 Sheets-Sheet 2

INVENTOR
Arthur F. Oatley
By Ralph B. Stewart
attorney

Nov. 16, 1954   A. F. OATLEY   2,694,392
COOKER AND GRILL

Filed June 22, 1951

INVENTOR
Arthur F. Oatley
By Ralph B. Stewart
attorney

Nov. 16, 1954

A. F. OATLEY 2,694,392

COOKER AND GRILL

Filed June 22, 1951

INVENTOR
Arthur F. Oatley
By Ralph B. Stewart
Attorney

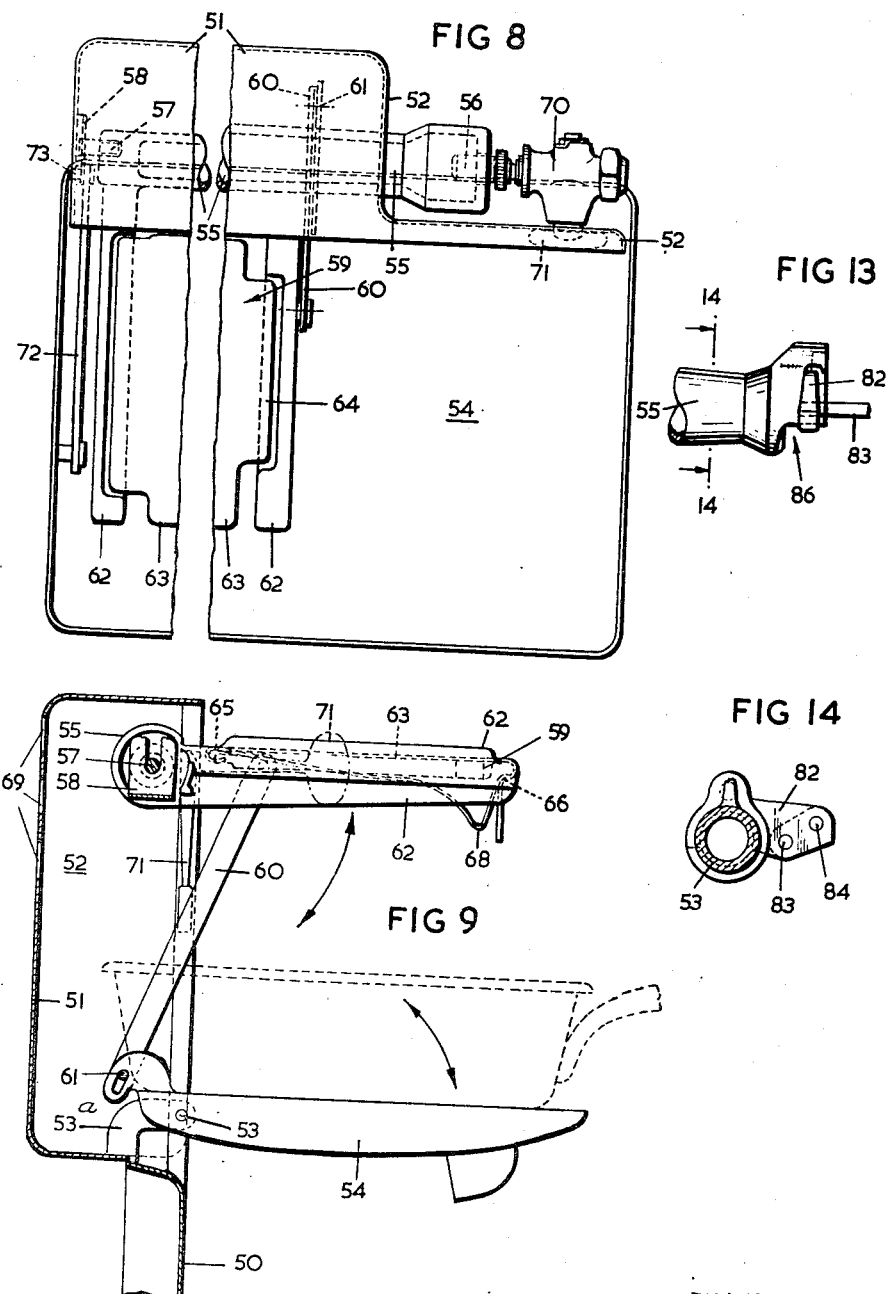

Nov. 16, 1954  A. F. OATLEY  2,694,392
COOKER AND GRILL
Filed June 22, 1951  6 Sheets-Sheet 6
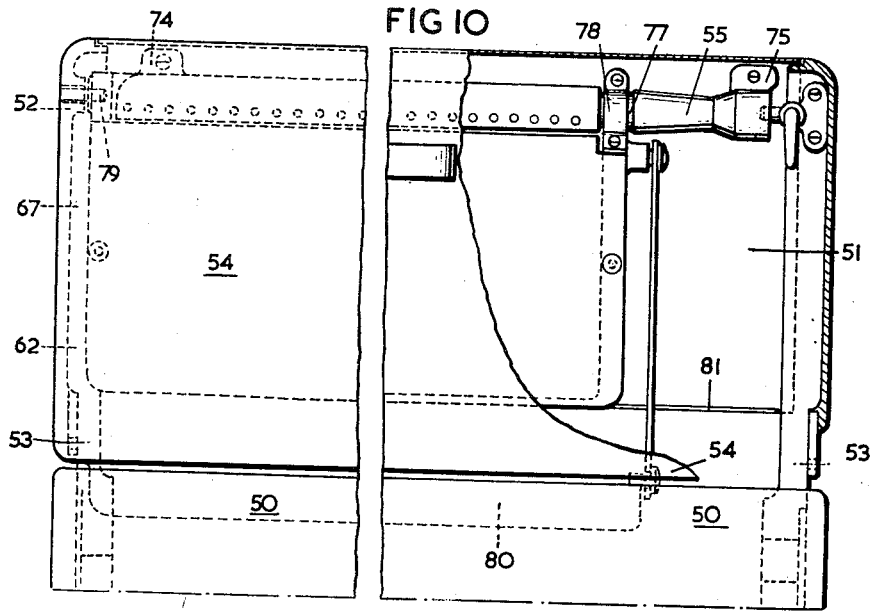
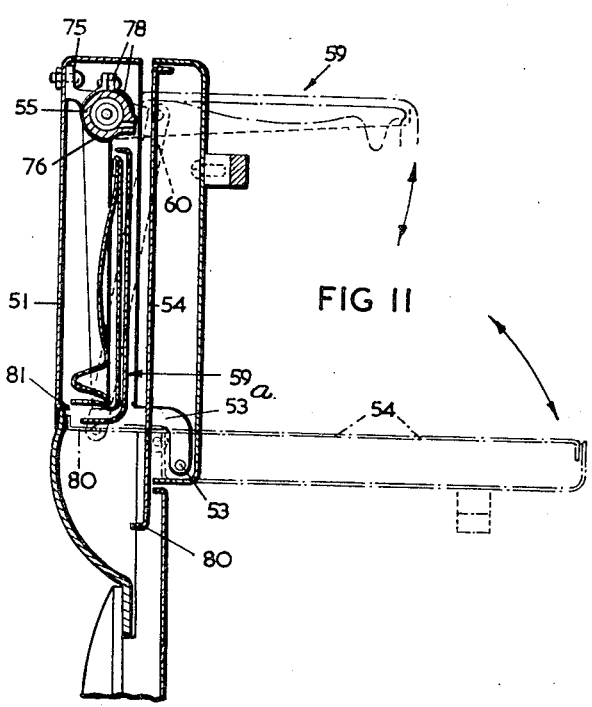
INVENTOR
Arthur F. Oatley
By Ralph B. Stewart
Attorney United States Patent Office 2,694,392
Patented Nov. 16, 1954

2,694,392

COOKER AND GRILL

Arthur Frederick Oatley, Deepfields, near Bilston, England, assignor, by mesne assignments, to Cannan Industries Limited, Deepfields, near Bilston, England, a British company Application June 22, 1951, Serial No. 232,993

10 Claims. (Cl. 126—41)

The invention relates to grills and more especially to grills provided on domestic cookers, but it is readily capable of application to grills mounted on a suitable support surface and independent of a cooker oven.

In the usual type of domestic cooker, the grill is situated in a space provided below the hot plate and above the oven. This position of the grill is much below normal eye level and necessitates much bending on the part of the user, and promotes a bad cooking result and frequent waste of food through burning directly attributable to lack of easy and constant visual control necessary when cooking at high temperatures.

An object of the invention is to provide a grill, when applied to a cooker, which can be placed above the hot plate in a position which will provide the maximum of visual control necessary to ensure the best cooking results.

A further object is to provide a grill so mounted relatively to the cooker that it can be swung or rotated into a convenient position of use, and returned out of that position to a stowed position when required.

A still further object is to provide a grill which, when in the "stowed" or "in use" position presents little or no projection towards the rear of the cooker.

Various alternative embodiments of the invention will now be described by way of example with reference to the accompanying drawings in which:

Figure 1 is a vertical sectional view of a splash back of a cooker with a grill and pan support stowed away out of use.

Figure 2 is a vertical sectional view on the line 2—2 in Figure 3.

Figures 7, 8 and 9 are respectively a front elevation, a plan and a part sectional side elevation of an alternative construction of grill, burner and pan support assembly seen in a position of use.

Figure 10 is a front elevation of a further alternative grill and pan support assembly with part of the pan support broken away and showing the parts stowed away out of use.

Figure 11 is a part-sectional elevational view of the construction seen in Figure 10, with the parts indicated by chain-dotted lines shown in a position of use.

Figure 13 is a fragmentary front elevation of the end of the burner tube looking in the direction of the arrow A in Figure 6.

Figure 14 is a transverse sectional view on the line 14—14 in Figure 13.

Figure 3:
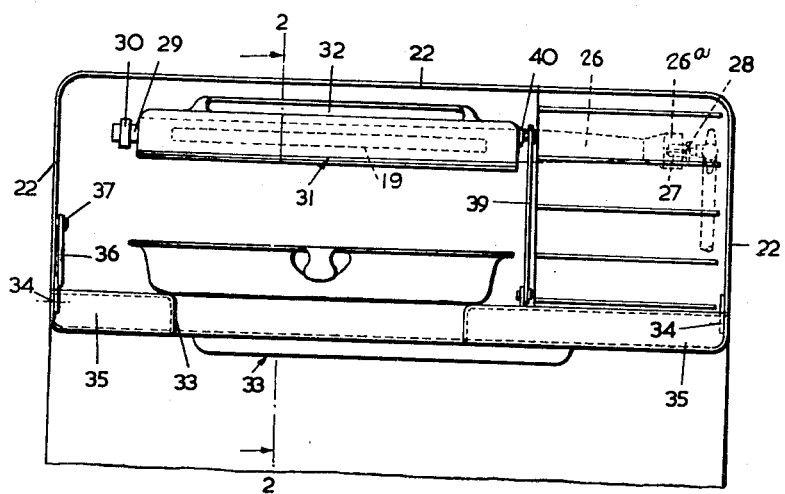
Figure 3 is a front elevation of the arrangement shown in Figure 1, but with the grill and pan support swung into a position of use and a grill pan placed on the pan support.

In the example shown in Figures 1 to 4, inclusive, the grill is indicated generally by the reference numeral 19. 20 in Figure 1 indicates the level of the top of a cooker hot plate, and 21 indicates an enamelled plate, usually known as the splashback.

A housing 22 is open at the front but otherwise closed on all sides except for suitable ventilation apertures such as 23. The housing is here shown as a separately made part secured upon the top edge of the splash back 21 but it may be convenient to form it integral with the splash back. In either event it may conveniently be supported on the cooker by upstanding brackets (not shown), such as are frequently used to provide rigid support for the splash back.

The grill in this example consists of two frets 24 suitably secured such as by screws (not shown) to side brackets 25 projecting integrally from a burner 26. The burner is provided with a bearing 26a to turn about a trunnion 27 from a gas supply control cock through which trunnion a gas passage and jet 28 are carried into the end of the burner which is provided in front of the bearing with the usual air inlets of an aerated burner. A co-axial pivot bearing at the other end comprises a trunnion 29 on the burner bracket 25 entering a bearing in a bracket arm 30 secured to the back. The grill 19 is shown as provided with a hood 31 with a forwardly directed outlet flue 32 for the products of combustion. The burner at the part between the brackets 25 and thus lying between and slightly below the frets 24 to which jets in its sides supply gas flames, is cranked from the pivotal axis of the trunnion mountings 27 and 29. The grill in this example is pivotal as a unit with the burner about the said axis and can be tilted into a horizontal position, Figure 4, which is its position of use, from a vertical position, Figure 1, in which it is within the housing 22 and after use returned to the housing.

Figure 4:
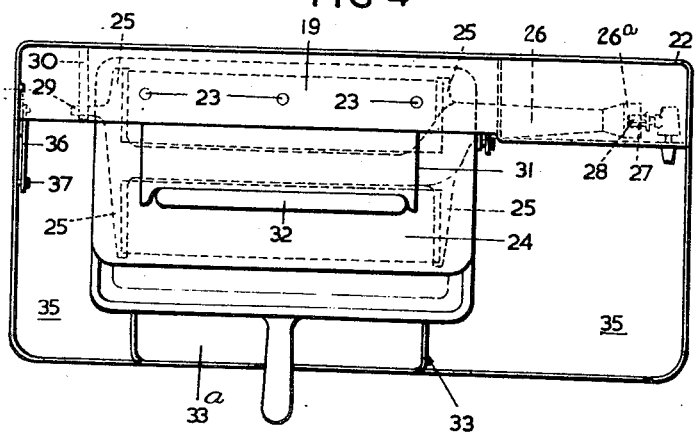
Figure 4 is a plan view of Figure 3.

A pan support plate 33 is hinged at 34 at a suitable level below the grill 19 and can likewise be swung into a horizontal position, Figure 4, and can be turned on its hinges into a substantially vertical position where it is in front of the housed grill and closes the housing, see Figure 1. As here shown the pan support 33 is dished and the central part 33a is left open at the top to accommodate the outlet flue in the housed position while the side portions 35 are closed by pressed sheet metal.

The pan support plate 33 has a slotted stay 36 pivoted to one side and moving over a headed peg 37 on the adjacent side wall of the housing 22 to maintain it in the horizontal position. It is further provided with an arm 38 off set from its hinge axis to which a connecting rod or link 39 is pivotally connected. The other end of this rod or link 39 has a pivotal connection with a lug 40 on the burner so as to rotate the burner and grill unit downwardly on its pivots 28, 29 into a substantially vertical position as the pan support is swung upwardly.

Figure 5:
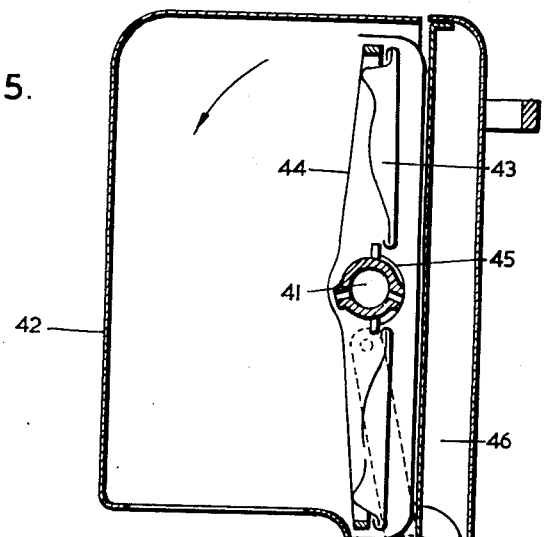
Figure 5 is a vertical sectional view of a sheet metal housing which can be secured above a cooker splash back or elsewhere, with a grill and pan support pivotally mounted in relation to a fixed burner within the housing and stowed away out of use.
Figure 6:
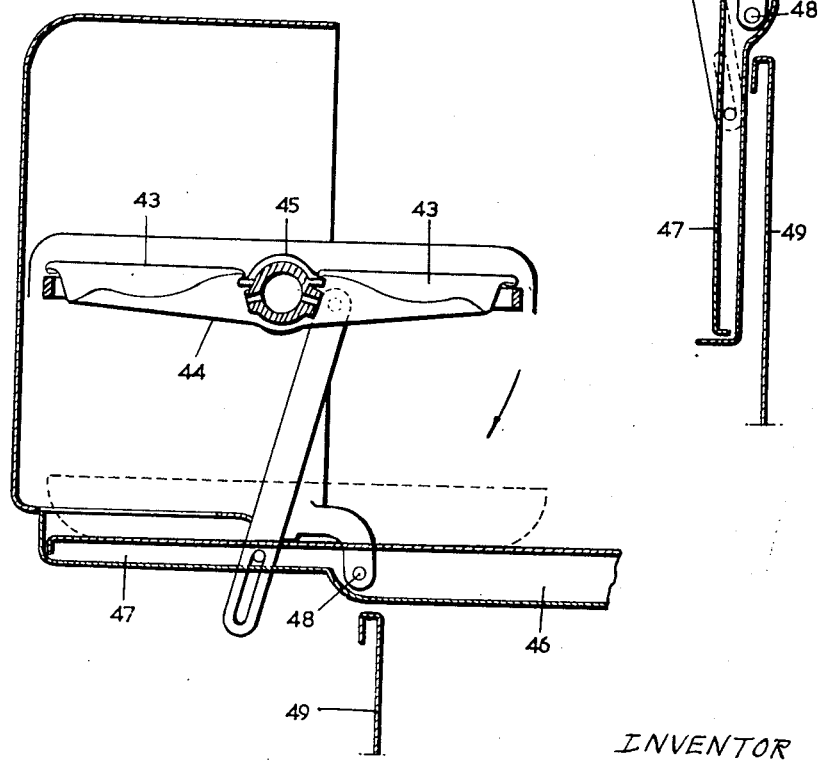
Figure 6 is a similar view to Figure 5 showing the parts in a position of use.

The example shown in Figure 5 and 6 is similar to that described above. The main features of difference are: That the burner 41 is fixed in the sides of the housing 42 and the grill unit 43 is secured to a rectangular frame 44 capable of being rotated about cylindrical parts of the burner at each end, the frame ends having part-circular bearing recesses and attached half circular bearing straps 45 encircling the said parts of the burner; that the bottom of the housing is open and the pan support plate 46 has an extension 47 behind its hinges 48 to provide further support for the pan near the back of the housing. The housing is secured a little behind the splash back 49 and the extension 47 rests behind the splash back in the housed position of the grill 43.

It will be seen that the embodiments hereinbefore described provide for a grill in which a metal fret or other heat-radiating member, provided with a gas burner the flames from which burner are projected on to the fret or heat radiating member, is mounted so that it is capable of being swung or rotated into a convenient position of use, and returned out of that position to a stowed position when desired. Moreover in addition to the grill already mentioned, the embodiments provide for a supporting shelf hingedly mounted at a convenient grilling distance from the fret or heat radiating member of the grill so as to be movable to a horizontal position to support a pan or the like carrying the food to be cooked and from that position into a vertical, or near vertical position in order to cover the said fret or heat radiating member when the latter is in its out of use position.

In the constructions illustrated in Figures 7–12 of the drawings, 50 represents a splash back of a cooker and 51 is a box-like housing open at the front and suitably secured at the top of the splash back as for example by upstanding brackets (not shown) from the cooker such as are frequently used to provide rigid support for the splash back. 52, are the side walls of the housing one of which is laterally extended in front of a point where the burner 55 enters it.

Pivots 53 are provided on the brackets 53a for a shallow pan support plate 54 so that the latter can be swung by hand on these pivots at its rear edge into a vertical position so as to close the open front of the housing 51. The burner 55 of the grill unit is pivoted about the gas supply nozzle or jet 56 at one end and at the other end is provided with a trunnion 57 entering a bearing in a bracket 58 the axis of which is co-axial with the burner jet. The grill 59 can, therefore, hang in a vertical position below the burner axis when the shallow pan support plate is closing the front of the housing 51. The grill unit 59 is connected at one side by means of a pivotal link 60 with a projection 61 beyond the pivot of the pan support plate 54. The grill can therefore be moved up into the operative position shown in Figures 7 to 9 when the support plate 54 is swung down into a horizontal position.

By this means the opening of the door of the housing brings the support plate 54 into a position to receive a pan or the like (shown in dotted lines in Figure 9) and swings the grill 59 into a substantially parallel position above the pan.

The burner 55 is a straight tube with flame jets along one side wall only and the grill 59 lies to one side of the burner axis. The burner is cast or provided with webbed support bars 62 and a heat-reflecting plate 63 is supported by end parts 64 thereon. The heat-reflecting plate 63 is bent at its rear end, as at 65 and at its front end, as at 66, to support a fret 67 of heat resisting metal suitably ribbed, waved, or otherwise provided with heat radiating surfaces on which the flames of the burner impinge, as is known in this art.

It is convenient to make the grill fret 67 so that its surface which is toward the pan support plate 54 in the operative position (see Figure 9) is outwardly and downwardly inclined from the rear ledge 65 at a small angle and that there is a pronounced downward bend or rib 68 at its extremity. This facilitates the contact between the fret and the flames at the parts more remote from the burner. By arranging the grill unit 59 wholly or mainly to one side of the burner axis there is no projection, or very little projection, beyond the burner tube towards the rear wall of the housing 51 when the burner 55 and grill are in the position of use (see more especially Figure 11) and similarly when the burner and grill are stowed in the housing there is no projection, or very little projection towards the top of the housing. The dimension from front to back of the housing can thus be kept low, where space is important, and similarly the overall height above the splash back can be kept down.

It is preferred to provide a plurality of slots 69 (Figure 9) through the back wall of the housing to form vents to assist in the dissipation of heat retained by the grill unit 59 if the latter is closed into the housing immediately after use.

It is also preferred to provide means whereby the grill unit cannot be swung into the housing and the housing closed by the pan support plate 54 whilst the fuel supply cock 70 is open to the burner tube.

Figure 7:
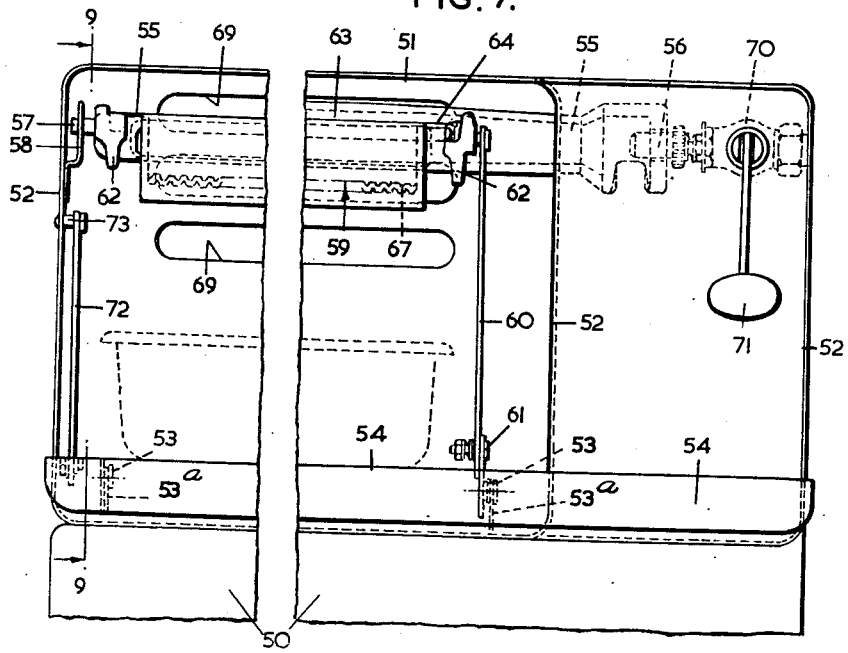

As an example of means for this purpose, I may provide that the handle 71 when the gas supply is "on" will foul the door formed by the support pan 54 as the latter is moved into the closing position; but when the gas is turned off the handle is in a position, see Figures 7 and 8, where it provides no obstruction to the closing of the front of the recess housing.

It is quite usual in gas tap construction to employ safety drop handles and by making the handle 71 of the gas cock 70 of greater length than is usual this can be arranged so that in the "on" position the handle will project horizontally into a position, shown in chain dotted lines in Figure 9, preventing the door from being closed.

At the left hand side of Figures 7 and 8, a pivotal bar 72 is shown between a pin 73 on the side wall of the housing 51 and a pin in the corresponding side of the pan support plate near the front to limit the downward movement of the plate.

The modification in construction shown in Figures 10 and 11 is that the burner 55 is fixed by small brackets 74, 75 to the back wall of the housing and the side bars 52 supporting the fret 67 are pivotally mounted. One side bar has a half circular bearing strap 76 fitting about a cylindrical part 77 of the burner tube and receives a half round clip 78 and the other side bar has a recess to receive a trunnion pin 79 screwed through the adjacent side wall 52 of the housing 51. Further the pan support plate 54 overhangs the pivots 53 as shown at 80 in Figure 11 and will engage the inturned edge 81 of the back of the housing to limit the downward movement of the main part of the plate. The inturned edge 81 also directs any moisture collecting on the back of the housing as a result of condensation or otherwise, on to the pan support plate.

Figure 12:
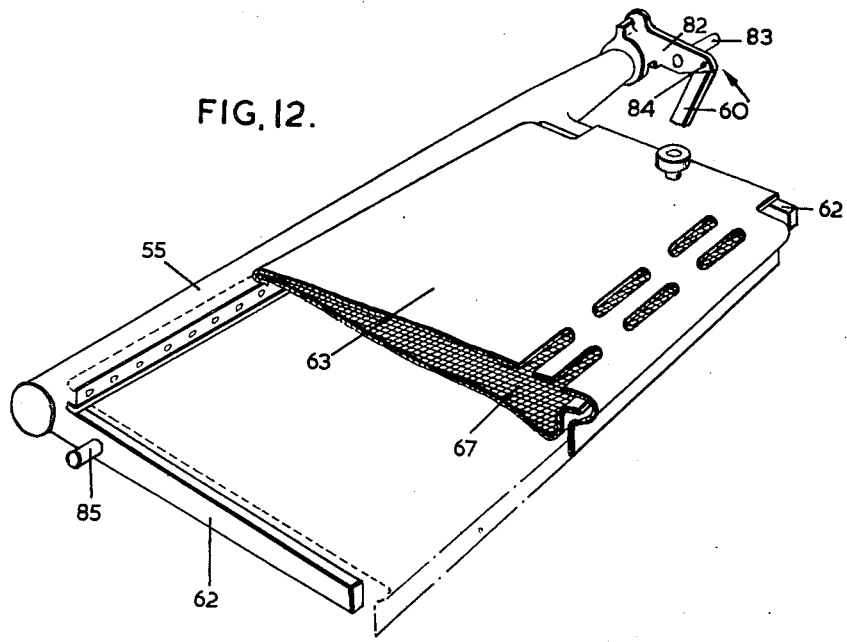
Figure 12 is a perspective view of a burner and grill in which the axis of rotation of the grill is off-set slightly from the burner axis.

In the arrangement illustrated in Figures 12 to 14, the pivotal axis about which the grill unit turns in the operation of bringing it into the position of use and from that position to the stowed position, is not coincident with the axis of the fuel supply jet and the burner but is offset slightly to one side. The pivot at one end of the unit is provided on an arm 82 preferably cast integral with the inlet mouth of the burner tube. This pivot is marked 83 and in the same arm provision is made at 84 for the connection of the pivotal link 60 by which the grill unit is connected to and operates with the pan support plate 54. At the other end of the grill unit a trunnion pin 85 is secured in one of the support bars 52 by which the grill fret carrier plate 63 and the fret 67 are supported. In this modification the co-axial pivots or trunnions 83, 85 around which the unit rotates are disposed so that the main part of the grill unit is to one side of the axis of rotation but the burner 55 is on the other side of the said axis. This, as compared, with a grill pivoting about its burner axis as in Figures 7 to 11 of the drawings, has the advantageous effect of reducing the vertical space above the pan shelf required for the movement of a grill of any particular radial dimension from the operative to the collapsed position, thus allowing a larger grill unit to be used without increasing the said vertical space. This may be important since the dimension at which efficient heat radiation for grilling is available has a limited tolerance. It has the further advantage that the burner acts to some extent as a counterbalance for the moving grill and facilitates raising the grill to operative position.

Since in this arrangement the burner will move during the movement of the fret away from the axis of the gas supply jet, the end of the burner tube is cut away for a segment of considerable size (see 86 Figs. 13 and 14) so that the mouth of the burner may ride clear of the jet and in turn into a co-axial relationship with it as the grill is stowed in a housing such as 51 and brought into the position of use as shown in Figure 11.

It will be seen that the embodiments hereinbefore described with reference to Figures 7–14 provide for a grill in which the fret or other heat-radiating surface and its supporting means lie substantially entirely to one side of the axis of the burner and are mounted to turn, either with the burner or relatively to a fixed burner, so that the grill can be moved into its operative position (substantially horizontal) and will present little or no projection beyond the burner towards the rear wall of the housing or casing, and can be moved into a pendant position substantially vertical, in which it presents little or no projection beyond the burner towards the top of the housing or casing.

It will be obvious from the illustrated embodiments how readily the construction of grill and pan support complete with housing could be applied to surfaces and supports for use independently of a cooker oven.

I claim:

1. In a gas cooker having a hot plate and a splash back supported on the cooker and projecting above the hot plate, a grilling appliance comprising a housing located on an upper part of the splash back and open towards the front of the cooker, a gas fired grill rotatably mounted in the housing for movement between substantially vertical and horizontal "stowed" and "in use" positions respectively, in which stowed position of the grill it is disposed entirely within the housing, a gas burner for heating said grill, a food support hinged to the housing at a point below the grill mounting and adapted to close the housing when the grill is stowed, means interconnecting the grill and food support whereby movement of the latter from its position where it closes the housing to a substantially horizontal position causes a corresponding movement of the grill, and vice versa, and means for releasably holding the grill and food support in their respective vertical or horizontal positions.

2. In a gas cooker having a hot plate and a splash back supported on the cooker and projecting above the hot plate, a grilling appliance comprising a housing located on an upper part of the splash back and open towards the front of the cooker, a grill pivotally mounted in an upper part of the housing, a burner for heating the grill, a heat-radiating fret supported on the burner, a hood surmounting the burner and fret and means for supporting the hood for rotation with the grill, a food support hinged to the housing at a point below the axis about which the grill pivots, linkage interconnecting the grill and food support to produce simultaneous rotary movement in opposite directions of the grill and food support when either one or the other is moved, and means whereby the grill and food support can be releasably held in a substantially horizontal vertical stowed position where the grill, burner, fret and hood are enclosed entirely within the housing and the food support closes the front of the housing.

3. In a gas cooker having a hot plate and a splash back supported on the cooker and projecting above the hot plate, a grilling appliance comprising a housing located on an upper part of the splash back and open towards the front of the cooker, a grill burner mounted in fixed position in a central part of the housing and adjacent the open front thereof, a frame pivoted on the burner, a grill fret mounted on the frame, a hood surmounting the fret and burner and mounted for rotation with the frame and fret, a food support hinged to the housing at a point below the axis about which the grill frame pivots, linkage interconnecting the frame and food support to produce simultaneous rotation in opposite directions of the frame and food supports when either one or the other is moved, and means whereby the frame and food support can be releasably held in a substantially horizontal position of use, or in a substantially vertical stowed position where the frame and its associated fret and hood are enclosed with the burner entirely within the housing and the food support closes the front of the housing.

4. In a gas cooker having a hot plate and a splash back supported on the cooker and projecting above the hot plate, a grilling appliance comprising a housing located on an upper part of the splash back and open towards the front of the cooker, a grill burner rotatably mounted in an upper part of the housing and a frame carried on and projecting entirely to one side of the burner, a heat-radiating fret mounted on the frame, a vented hood surmounting the fret and mounted to turn with the frame, a food support hinged to the housing at a point below the grill burner mounting, linkage interconnecting the frame and food support to produce simultaneous rotation in opposite directions of the frame and food support when either one or the other is moved, and means whereby the frame and food support can be releasably held in a substantially horizontal position of use, or in a substantially vertical position where the burner and its associated frame, fret and hood are enclosed entirely within the housing and the food support closes the front of the housing.

5. In a gas cooker having a hot plate and a splash back supported on the cooker and projecting above the hot plate, a grilling appliance comprising a housing located on an upper part of the splash back and open towards the front of the cooker, a grill burner mounted in an upper part of the housing and a frame rotatably mounted on and projecting entirely to one side of the burner, a heat-radiating fret mounted on the frame and a hood surmounting the fret and mounted to turn with the frame, a food support hinged to the housing at a point below the grill burner mounting, linkage interconnecting the frame and food support to produce simultaneous rotation in opposite directions of the frame and food support when either one or the other is moved, and means whereby the frame and food support can be releasably held in a substantially horizontal position of use, or in a substantially vertical position where the frame and its associated fret and hood are enclosed entirely within the housing and the food support closes the front of the housing.

6. A grilling appliance as specified in claim 1 and including a frame projecting from the said gas burner, a heat-radiating fret supported on the frame and having a rib along that edge which is most remote from the burner, jets on the burner directed towards the rib of the fret, and a vented hood mounted on the frame in a position where it covers the fret.

7. A grilling appliance as specified in claim 1 and including a fuel supply connected to said gas burner and including a control cock, a frame projecting from the burner, a heat-radiating fret supported on the frame, a vented hood mounted on the frame in a position where it covers the fret, and a handle on the gas control cock which, when the gas supply is "on", projects into a position where it obstructs movement of the pan support into a position where it closes the housing.

8. In a gas cooker having a hot plate, a grilling appliance comprising a housing having an open side, means mounting said housing above said hot plate at the rear edge thereof and with the open side of the housing facing towards the front of the cooker, a gas fired grill rotatably mounted in the housing for movement between substantially vertical and horizontal "stowed" and "in use" positions respectively, in which stowed position of the grill it is disposed entirely within the housing, a gas burner for heating said grill, a food support hinged to the housing at a point below the grill mounting and adapted to close the housing when the grill is stowed, means interconnecting the grill and food support whereby movement of the latter from its position where it closes the housing to a substantially horizontal position causes a corresponding movement of the grill, and vice versa, and means for releasably holding the grill and food support in their respective vertical or horizontal positions.

9. A grilling appliance comprising a food support having an extended flat shelf-like supporting surface, means pivotally mounting said support for movement from a position of use in which the shelf-like surface thereof is in a horizontal plane to a position of storage in which said shelf-like surface is in a vertical plane, a heated grill, means pivotally mounting said grill above said food support for movement from a substantially horizontal position of use to a substantially vertical position of storage where it is covered by the food support, and means interlocking said food support and said grill for effecting simultaneous movement of said support and grill into the horizontal and vertical positions respectively.

10. A grill appliance comprising an open-faced housing arranged with its open face in a vertical plane, a heated grill, means pivotally mounting said grill in the upper part of said housing for movement from the substantially horizontal position of use to a substantially vertical stored position where it is disposed entirely within said housing, a flat food support, means pivotally mounting said food support upon said housing at a point below said grill for movement from a substantially horizontal position of use to a substantially vertical position of storage where it closes the front of said housing, and means interlocking said food support and said grill for effecting simultaneous movement of said support and grill into the horizontal and vertical positions respectively.

References Cited in the file of this patent

UNITED STATES PATENTS

| Number | Name | Date |
|---|---|---|
| 1,930,663 | Rogers | Oct. 17, 1933 |
| 2,207,307 | Teller | July 9, 1940 |
| 2,523,641 | Alvarez | Sept. 26, 1950 |
| 2,572,870 | Kennedy | Oct. 30, 1951 |
| 2,578,227 | Chambers | Dec. 11, 1951 |
| 2,624,331 | Kennedy | Jan. 6, 1953 |

FOREIGN PATENTS

| Number | Country | Date |
|---|---|---|
| 566,270 | France | Feb. 12, 1924 |
| 515,034 | Great Britain | Nov. 23, 1939 |
| 675,974 | Great Britain | July 16, 1952 |